US012060155B2

(12) United States Patent
Masefield et al.

(10) Patent No.: US 12,060,155 B2
(45) Date of Patent: Aug. 13, 2024

(54) SYSTEM AND METHOD FOR LIFT AUGMENTATION OF AN AIRCRAFT TAILPLANE

(71) Applicant: Electra Aero, Inc., Manassas, VA (US)

(72) Inventors: Oliver Masefield, Stans (CH); Mark Drela, Cambridge, MA (US); Christopher B. Courtin, Somerville, MA (US)

(73) Assignee: Electra Aero, Inc., Manassas, VA (US)

( * ) Notice: Subject to any disclaimer, the term of this patent is extended or adjusted under 35 U.S.C. 154(b) by 0 days.

(21) Appl. No.: 18/100,935

(22) Filed: Jan. 24, 2023

(65) Prior Publication Data

US 2023/0234718 A1 Jul. 27, 2023

Related U.S. Application Data

(60) Provisional application No. 63/302,712, filed on Jan. 25, 2022.

(51) Int. Cl.
*B64D 31/00* (2024.01)
*B64C 5/02* (2006.01)
(Continued)

(52) U.S. Cl.
CPC .............. *B64D 31/00* (2013.01); *B64C 5/02* (2013.01); *B64C 9/00* (2013.01); *B64D 27/24* (2013.01); *G05D 1/0808* (2013.01)

(58) Field of Classification Search
CPC .......... B64D 31/00; B64D 27/24; B64C 5/02; B64C 9/00; G05D 1/0808
See application file for complete search history.

(56) References Cited

U.S. PATENT DOCUMENTS 2,978,207 A * 4/1961 Macaulay ................ B64C 9/38
244/45 R
3,016,213 A * 1/1962 Griswold, II ......... B64C 23/005
244/207
(Continued)

OTHER PUBLICATIONS

IEEE Xplore—EEEAC Paper #2439, Version II, Updated Jun. 1, 2014—Development of a Circulation Control Wing for UAVs Konstantinos Kanistras , Matthew J. Rutherford, Kimon P. Valavanis (Year: 2014).*

(Continued)

*Primary Examiner* — Donald J Wallace
*Assistant Examiner* — Jalal C Coduroglu
(74) *Attorney, Agent, or Firm* — Duane Morris LLP

(57) ABSTRACT

In some embodiments, a lift augmentation system for a blown lift aircraft includes a blown lift tailplane operatively coupled to the blown lift aircraft. The blown lift tailplane may include a leading edge and a trailing edge, an upper surface and a lower surface, and a first side and a second side. The lift augmentation system may include one or more tailplane thrust-producing devices on the first side and the second side of the blown lift tailplane operatively coupled to the leading edge of the blown lift tailplane. The one or more tailplane thrust-producing devices on the first side and the second side of the blown lift tailplane may produce a plurality of slipstreams corresponding to each of the tailplane thrust-producing devices. The plurality of slipstreams corresponding to each of the tailplane thrust-producing devices may blow over the upper surface and the lower surface of the blown lift tailplane.

17 Claims, 9 Drawing Sheets

(51) Int. Cl.
   *B64C 9/00*      (2006.01)
   *B64D 27/24*     (2024.01)
   *G05D 1/00*      (2024.01)

(56) References Cited

U.S. PATENT DOCUMENTS

| | | | | |
|---|---|---|---|---|
| 3,572,614 | A * | 3/1971 | Bertelsen | B64C 39/10 |
| | | | | 244/12.1 |
| 3,614,028 | A * | 10/1971 | Kleckner | B64C 21/025 |
| | | | | 244/54 |
| 3,974,987 | A * | 8/1976 | Shorr | B64C 21/04 |
| | | | | 244/212 |
| 3,977,630 | A * | 8/1976 | Lewis | B64C 9/16 |
| | | | | 244/216 |
| 4,043,523 | A | 8/1977 | Bartoe, Jr. | |
| 4,117,995 | A * | 10/1978 | Runge | B64C 9/146 |
| | | | | 244/130 |
| 4,457,480 | A * | 7/1984 | Englar | B64C 9/24 |
| | | | | 244/35 R |
| 4,483,497 | A * | 11/1984 | Rethorst | B64C 30/00 |
| | | | | 244/119 |
| 4,767,083 | A * | 8/1988 | Koenig | B64C 29/0066 |
| | | | | 244/12.3 |
| 5,071,088 | A * | 12/1991 | Betts | B64C 29/0066 |
| | | | | 244/45 R |
| 6,923,403 | B1 * | 8/2005 | Dizdarevic | B64C 39/10 |
| | | | | 244/36 |
| 11,192,637 | B2 * | 12/2021 | Giannini | B64C 21/08 |
| 11,198,519 | B1 * | 12/2021 | Seeley | B64F 1/31 |
| 11,305,869 | B1 * | 4/2022 | Ward | B64C 9/24 |
| 2011/0266081 | A1 * | 11/2011 | Novikov-Kopp | B60V 1/08 |
| | | | | 114/272 |
| 2015/0144742 | A1 * | 5/2015 | Moxon | B64C 11/00 |
| | | | | 244/65 |
| 2018/0162525 | A1 * | 6/2018 | St. Clair | B64C 29/0025 |
| 2018/0222583 | A1 * | 8/2018 | Parks | B64C 37/02 |
| 2020/0150690 | A1 * | 5/2020 | Gálffy | G05D 1/0808 |
| 2020/0407060 | A1 * | 12/2020 | Hosseini | B64D 27/02 |
| 2021/0261245 | A1 * | 8/2021 | Tao | B64C 9/00 |
| 2022/0169380 | A1 * | 6/2022 | Mehrgan | B64C 39/08 |
| 2022/0169400 | A1 * | 6/2022 | Seeley | B64C 25/10 |
| 2022/0177115 | A1 * | 6/2022 | Lamaille | B64C 21/04 |
| 2023/0063801 | A1 | 3/2023 | Courtin et al. | |

OTHER PUBLICATIONS

Oliver Masefield, Christopher B. Courtin, and Robert John Hansman, System and Method for Controlling Flight Path of a Blown Lift Aircraft, Unpublished U.S. Appl. No. 18/085,275, filed Dec. 20, 2022, United States.

* cited by examiner

SYSTEM AND METHOD FOR LIFT AUGMENTATION OF AN AIRCRAFT TAILPLANE

CROSS REFERENCE TO RELATED APPLICATIONS

This application claims the benefit of priority under 35 U.S.C. § 119(e) to prior U.S. Provisional Application No. 63/302,712 filed on Jan. 25, 2022, the disclosure of which is incorporated by reference herein in its entirety.

FIELD OF DISCLOSURE

The present disclosure generally relates to the field of aviation. More specifically, the present disclosure generally relates to a blown lift tailplane of an aircraft to increase the effectiveness of the tailplane by using thrust producing devices to blow over the surfaces of the tailplane.

BACKGROUND

Aircraft experience various forces while in flight and have to control motion around the roll, pitch and yaw axes. All fixed wing aircraft designed with powerful wing trailing edge flaps experience pitching moments about the pitch axis when the flaps are deployed. These pitching moments are typically countered by designing the aircraft to include a conventional tailplane. The conventional tailplane is used to stabilize the aircraft in the pitch axis by providing a surface for lift at the rear of the aircraft. The local velocity over the wing and flaps provide an undisturbed flow velocity at a downwash angle. The downwash velocity produced by the flaps, in addition to low flight speed enabled by the flaps, limit the conventional tailplane's lift force.

FIG. 1 is a streamline plot from flapped wings interacting with a conventional tailplane. Flapped wing streamline plot 100 shows streamlines 104 passing over a wing 106 and flap 108, which produces a wing pitching moment 110 due to the fluid interaction with the wings local velocity illustrated by the streamlines 104 over the wing 106 and flap 108. After passing over the wing 106 and flap 108 combination, the streamlines 104 produce an undisturbed flow velocity vector 112 and wing downwash velocity 114 vector due to a downwash angle 116. Additionally, FIG. 1 shows a conventional tailplane 102 interaction with the streamlines 104 after the streamlines 104 pass over the wing 106 and flap 108 combination. In the case of a conventional tailplane 102, a tail lift 118 is generated by the downwash velocity 114. In a blown lift aircraft the flap's 108 pitching moment 110 is increased and the downwash velocity 114 is also significantly increased over the conventional tailplane 102.

This maximum lift limitation created by the flaps and slow flight speed is especially severe for aircraft that rely on blown lift technology with a Distributed Electric Propulsion (DEP) system with Electric Propulsion Units (EPUs) operatively coupled to the aircraft's wings. In a blown lift aircraft, the EPUs are used to blow air over and under the wings augmenting the lift of the wings. The blown lift aircraft may be the aircraft disclosed in U.S. patent application Ser. No. 17/560,383 filed on Dec. 23, 2021, the disclosure of which is incorporated by reference herein in its entirety.

FIG. 2 is a streamline plot of a conventional tailplane. Conventional tailplane streamline plot 200 shows the wing's local velocity streamline 202 with streamlines 104 passing over the conventional tailplane 102 and elevator 204. In this case, there is low available lift 206 for the conventional tailplane 102 and flow separation 208 may occur leaving behind streamlines with low speed wake 210.

The blown lift aircraft configuration increases the flaps' 104 pitching moments 110 and the downwash velocity 114 effect on a conventional tailplane 102. As seen in FIG. 2, the wing's local velocity 202 streamlines 104 pass over the conventional tailplane 102. The downwash velocity 114 causes the conventional tailplane 102 to have low available lift 206 (e.g., limits the maximum lift). The blown lift configuration also reduces the airspeed of the aircraft which further limits the maximum available lift of the conventional tailplane 102. Conventionally, a solution to this problem is to use an all-flying (fully moveable) tailplane and/or to increase the size of the tailplane. Some aircraft are also designed with the tailplane above the worst downwash area, requiring a large vertical tail. These solutions add considerable weight and drag to the aircraft, which is undesirable. Another solution to this problem is to have bleed air from the aircraft's propulsion system flow over a portion of the tail through a gap between the stabilizer and the elevator, which suppresses tail stall, but this requires complex plumbing, with a reduction in propulsion system thrust. Other aircraft designs accept the downwash problem and place limitations on the aircraft's operating conditions.

The present disclosure addresses the challenges and problems for an aircraft experiencing a lack of effectiveness of the conventional tailplane 102 due to the adverse effects of downwash velocity 114 at the location of the conventional tailplane 102 and low flight speed. Embodiments of the present disclosure advantageously allow for an increase in maximum lift available (or increasing the available lift 206) for the tailplane 102 by using dedicated thrust-producing devices to blow over the tailplane.

SUMMARY OF THE DISCLOSURE

In accordance with some embodiments, a lift augmentation system for a blown lift aircraft may include a blown lift tailplane operatively coupled to the blown lift aircraft. The blown lift tailplane may include a leading edge and a trailing edge, an upper surface and a lower surface, and a first side and a second side. The lift augmentation system may further include one or more tailplane thrust-producing devices on the first side and the second side of the blown lift tailplane operatively coupled to the leading edge of the blown lift tailplane. The one or more tailplane thrust-producing devices on the first side and the second side of the blown lift tailplane may be configured to produce a plurality of slipstreams corresponding to each of the tailplane thrust-producing devices. The plurality of slipstreams corresponding to each of the tailplane thrust-producing devices may blow over the upper surface and the lower surface of the blown lift tailplane.

In accordance with some embodiments, a lift augmentation system for a blown lift aircraft includes a blown lift aircraft and a blown lift tailplane with a leading edge and a trailing edge, an upper surface and a lower surface, and a first side and a second side operatively coupled to the blown lift aircraft. The lift augmentation system may also include one or more tailplane electric propulsion units of a distributed electric propulsion system operatively coupled to the leading edge on the first side and the second side of the blown lift tailplane. The one or more tailplane electric propulsion units may be configured to produce a plurality of slipstreams corresponding to each of the tailplane electric propulsion units, and wherein the plurality of slipstreams corresponding to each of the tailplane electric propulsion units blow over the upper surface and the lower surface of the blown lift tailplane. The lift augmentation system may also include a computing device communicatively coupled to the one or more tailplane electric propulsion units. The computing device may include at least one processor configured to control a first power level setting of the one or more tailplane electric propulsion units on the first side and the second side of the blown lift tailplane.

In accordance with some embodiments, a non-transitory computer readable medium having instructions stored thereon, wherein the instructions, when executed by at least one processor, may cause a computing device to perform operations including receiving a plurality of conditions from a plurality of sensors. The operations may also include determining a power level setting for at least one tailplane electric propulsion unit operatively coupled to a blown lift tailplane of a blown lift aircraft based at least in part on the plurality of conditions from a plurality of sensors. The operations may also include controlling the at least one tailplane electric propulsion unit based at least in part on the determination of the power level setting.

BRIEF DESCRIPTION OF THE DRAWINGS

The foregoing and other advantages of the present disclosure will become apparent upon reading the following detailed description and upon reference to the drawings.

Figure 1:
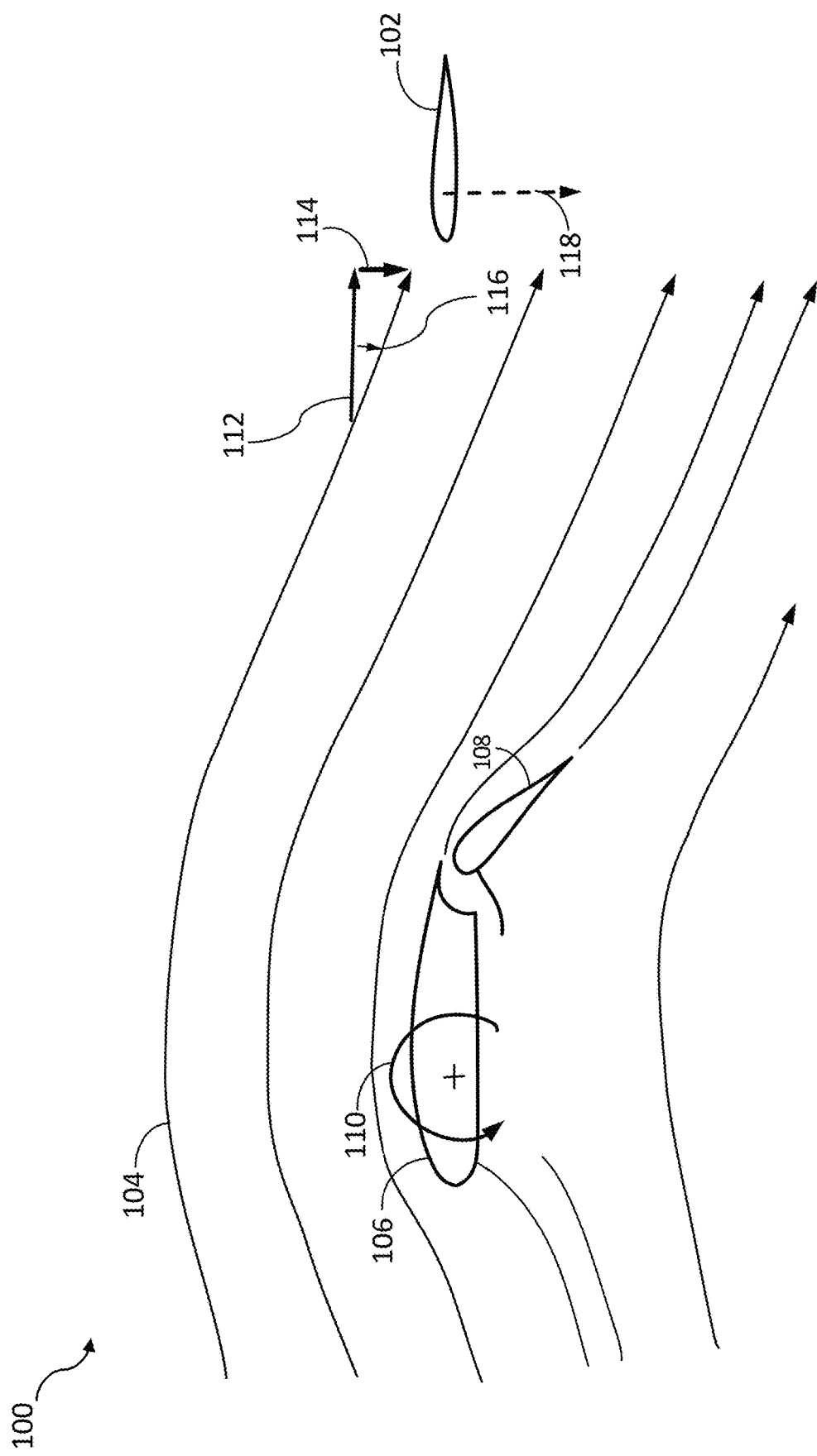
FIG. 1 is a streamline plot from flapped wings interacting with a conventional tailplane.
Figure 2:
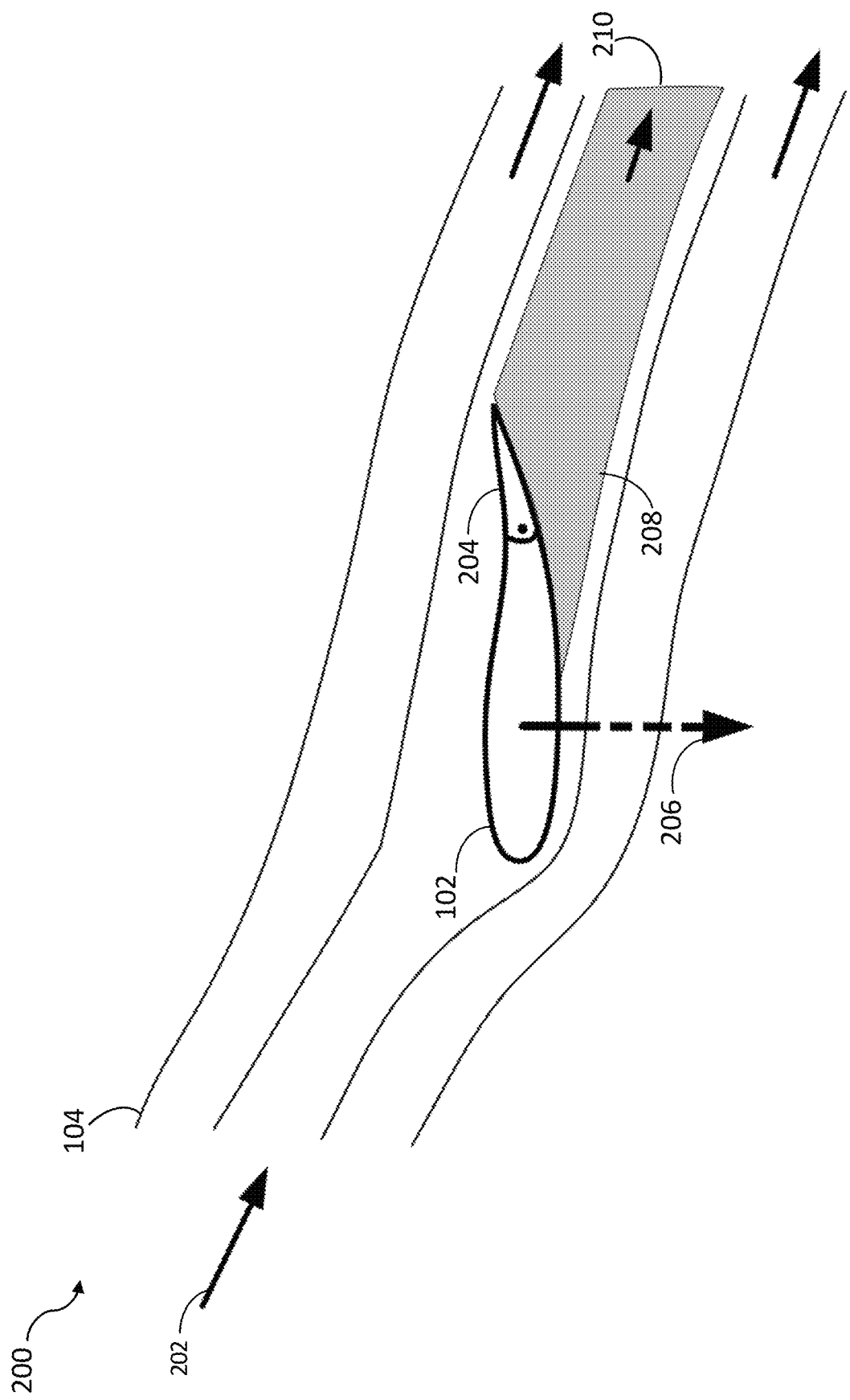
FIG. 2 is a streamline plot of a conventional tailplane.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

The present disclosure is directed to a system and method for lift augmentation of an aircraft tailplane through the use of a blown lift tailplane. The lift augmentation system utilizes thrust-producing devices operatively coupled to an aircraft's tailplane to augment the lift available to the tailplane by producing a plurality of slipstreams configured to blow over the surfaces of the blown lift tailplane. According to embodiments of the present disclosure, the lift augmentation system includes a distributed electric propulsion (DEP) system with electric propulsion units (EPUs) powering propellers operatively coupled to the leading edge of the tailplane. According to the present disclosure, the blown lift tailplane refers to an aerodynamic surface used to control and stabilize an aircraft and not to generate lift (such as on a tandem-wing aircraft). There will typically be between one and four EPUs per surface and per side. The EPUs may be used to blow over a substantial portion of both the upper and lower surfaces of the tailplane to increase the maximum lift available for the tailplane in some embodiments.

Figure 3:
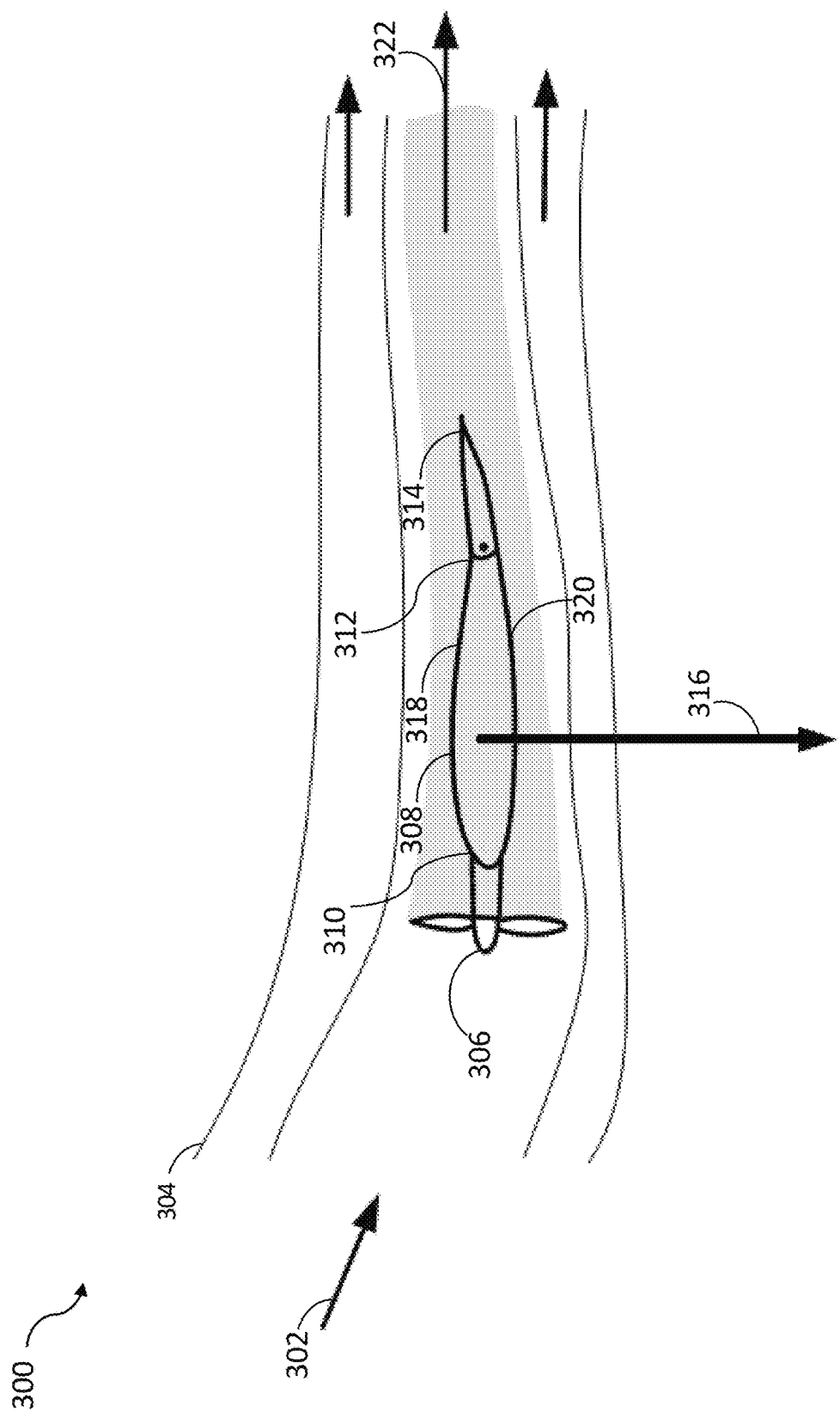
FIG. 3 is a streamline plot of a blown lift tailplane in accordance with some embodiments.

FIG. 3 is a streamline plot of a blown lift tailplane in accordance with some embodiments. In blown lift tailplane streamline plot 300, the wing's local velocity 302 passes through the tailplane EPU 306, and over the blown lift tailpane 308, having a leading edge 310, trailing edge 312, and elevator 314. In this blown lift tailplane 308 embodiment, there is increased available lift force 316 based on the blowing from the tailplane EPU 306 operatively coupled to the leading edge 310 of the blown lift tailplane 308. After the wing's local velocity 302 passes through the tailplane EPU 306 and over the blown lift tailpane's 308 upper surface 318 and lower surface 320 transition to a high speed jet 322 aft of the blown lift tailplane 308.

A blown lift tailplane 308 (i.e., at least one or more tailplane EPU(s) 306 operatively coupled to the blown lift tailplane 308 leading edge 310) is especially advantageous over conventional tailplanes 102 in a blown lift aircraft due to especially low flight speed and large wing downwash velocity 114 in such aircraft. The added propeller slipstream velocity, from the tailplane EPU 306, along the propeller axis makes the net resulting local velocity more aligned with the blown lift tailplane 308, as well as energizes the blown lift tailplane's 308 pressure field, resulting in an increase in the blown lift tailplane's 308 lift capability. Additionally, a blown lift tailplane 308 with a deflected elevator 314 may further increase the entire tailplane's lift force 316. The elevator 314 is configured to deflect at least between 0-50 degrees from a chord of the blown lift tailplane 308. In some embodiments, a slot (not shown) between the blown lift tailplane 308 and elevator 314 may be used to further increase the blown lift tailplane's 308 maximum lift force. In some embodiments an "all-flying" tailplane with an integrated tab may be used instead of the blown lift tailplane 308 plus elevator 314 configuration shown in FIG. 3.

Another advantage to a blown lift tailplane 308 according to various embodiments is that the tailplane EPU 306 slipstream behind the blown lift tailplane 308 acts as a pneumatic chord extension. This makes the blown lift tailplane 308 act aerodynamically as though it had a larger physical surface area, meaning a smaller blown lift tailplane 308 may be used to have the same lift and pitching moment effect as a larger conventional tailplane 102. Additionally, in an all-flying blown lift tailplane configuration the tailplane EPU(s) 306 may be used to balance the blown lift tailplane 308 about its pivot instead of additional non-essential weight added to achieve the same effect on a non-blown all-flying tailplane.

In various embodiments, a DEP system with tailplane EPU(s) 306 are advantageous because high power tailplane EPU(s) 306 with small diameter propellers provide the highest slipstream velocity thus enhancing the positive effects from a blown lift tailplane 308 mentioned above. In some embodiments, the propeller diameter of the tailplane EPU(s) 306 is optimized based on the area of the blown lift tailplane 308 that is affected by the slipstream and the amount of thrust produced. This can be especially important in the landing performance of the aircraft.

Tailplane EPU(s) 306 used on a blown lift tailplane 308 are operated to increase the lift force 316 of the blown lift tailplane 308. The increased lift force 316 generated by the tailplane EPU(s) 306 is used to counteract and overcome high downwash velocity 114 the blown lift tailplane 308 may experience. The tailplane EPU(s) 306 may also be used to counteract and overcome a scenario where the elevator 314 experiences a loss of effectiveness. The increased lift force 316 delivered by the tailplane EPU(s) is especially advantageous during a descent/approach or takeoff/climb mode of operation due to the deflected flap configuration and slow airspeed the aircraft experiences.

Figure 4:
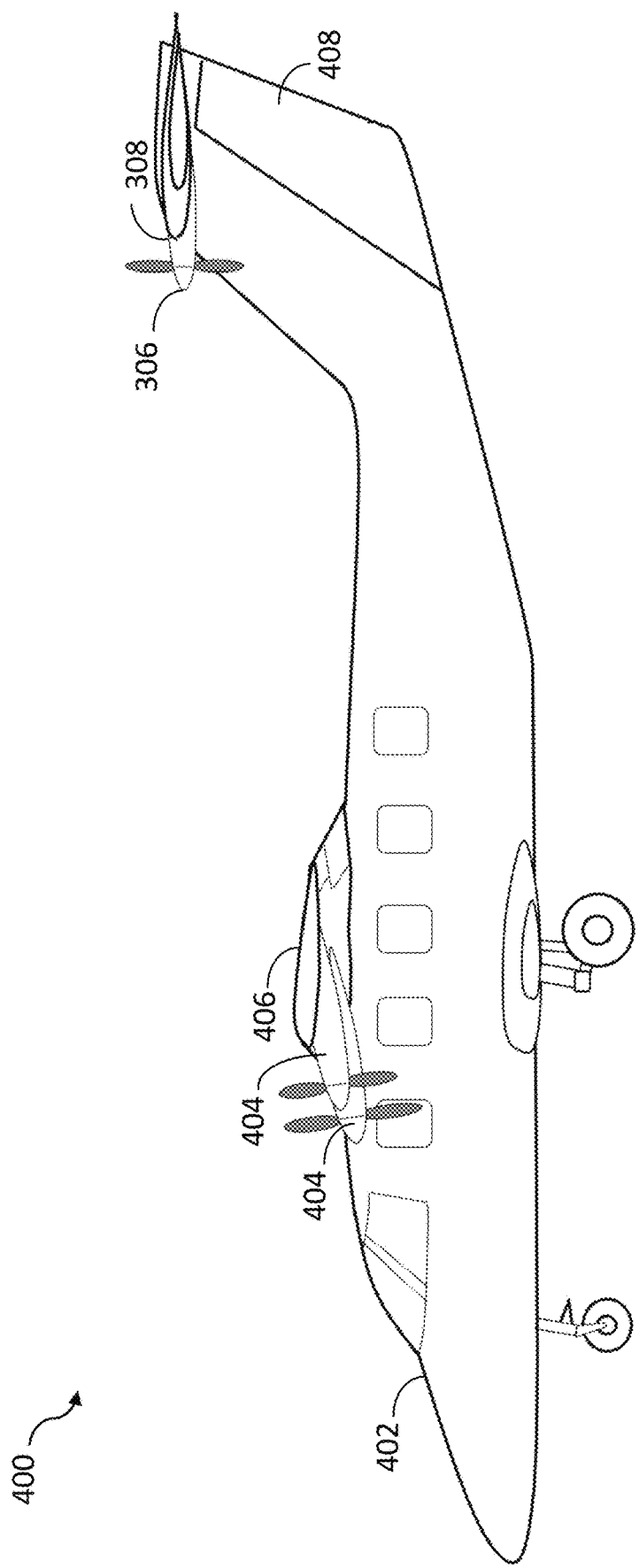
FIG. 4 is a side view of an aircraft with a blown lift tailplane in accordance with some embodiments.

FIG. 4 is a side view of a blown lift aircraft with a blown lift tailplane in accordance with some embodiments. The blown lift aircraft 400 has a fuselage 402, thrust-producing devices/propulsion devices, or wing EPU(s) 404, operatively coupled along each side of the pair of wings 406, and vertical stabilizer 408. The blown lift aircraft 400 also includes a blown lift tailplane 308 with at least one tailplane EPU(s) 306 along the leading edge 310 of each side of the blown lift tailplane 308 to blow over the upper surface 318 and lower surface 320 of the blown lift tailplane 308. However, other means for producing thrust may be used according to some embodiments. In other embodiments a single tailplane EPU 306 might be used. In some embodiments, a series of tailplane EPUs 306 along the span of the blown lift tailplane 308 may be used. In other embodiments, the tailplane EPU(s) 306 blowing on the blown lift tailplane 308 may also be fixed to another part of the blown lift aircraft 400, instead of directly attached to the blown lift tailplane 308, but still aligned so that the blown lift tailplane 308 benefits from the tailplane EPU's 306 high speed jet (or slipstream) 320. In various embodiments, the blown lift tailplane may not be limited to the horizontal tailplane, but may also be applied to a vertical stabilizer 408. In some embodiments, a slot (not shown) between the blown lift tailplane 308 and elevator 314 of the blown lift tailplane 308 may be used to further increase the blown lift tailplane's maximum lift force. In some embodiments the blown lift tailplane 308 may be fixed, in other embodiments the blown lift tailplane 308 may be trimmable.

In various embodiments, the power applied to the tailplane EPU(s) 306 may be a function of the power applied to the wing EPUs 404, and used together to achieve a specified performance. In other embodiments, the power applied to all of the tailplane EPUs 306 and wing EPU(s) 404 on the blown lift aircraft 400 may be determined and controlled automatically by algorithms contained in a flight control computing device, such as a Power Management Computer (PMC) illustrated in FIG. 6. These algorithms are calculations which consider all of the aircraft and environmental input data and compute the required power for each of the tailplane EPUs 306 and wing EPU(s) 404 based on those conditions. Some embodiments use best-fit equations to define a preset mapping between power, airspeed, and a performance parameter. As alternatives to equations, look-up tables can be used which contain the same input data information in tabular form and provide the power output, or a combination of equations and tables or similar open-loop methods of calculation. Additional closed-loop control algorithms may be employed, which can include fixed or scheduled gain-feedback based on the specified performance parameter. More sophisticated control approaches including non-linear or model-based controllers may also be employed in various embodiments. In various embodiments, the power level may change as aircraft configuration changes, such as a deflection in the flaps, aileron droop, spoiler extension or landing gear extension. The aforementioned methods to determine the required power output for each tailplane EPU(s) 306 and wing EPU(s) 404 are merely a few examples for carrying out the process. A person of ordinary skill in the art would appreciate and understand other ways to achieve the same results.

Figure 5:
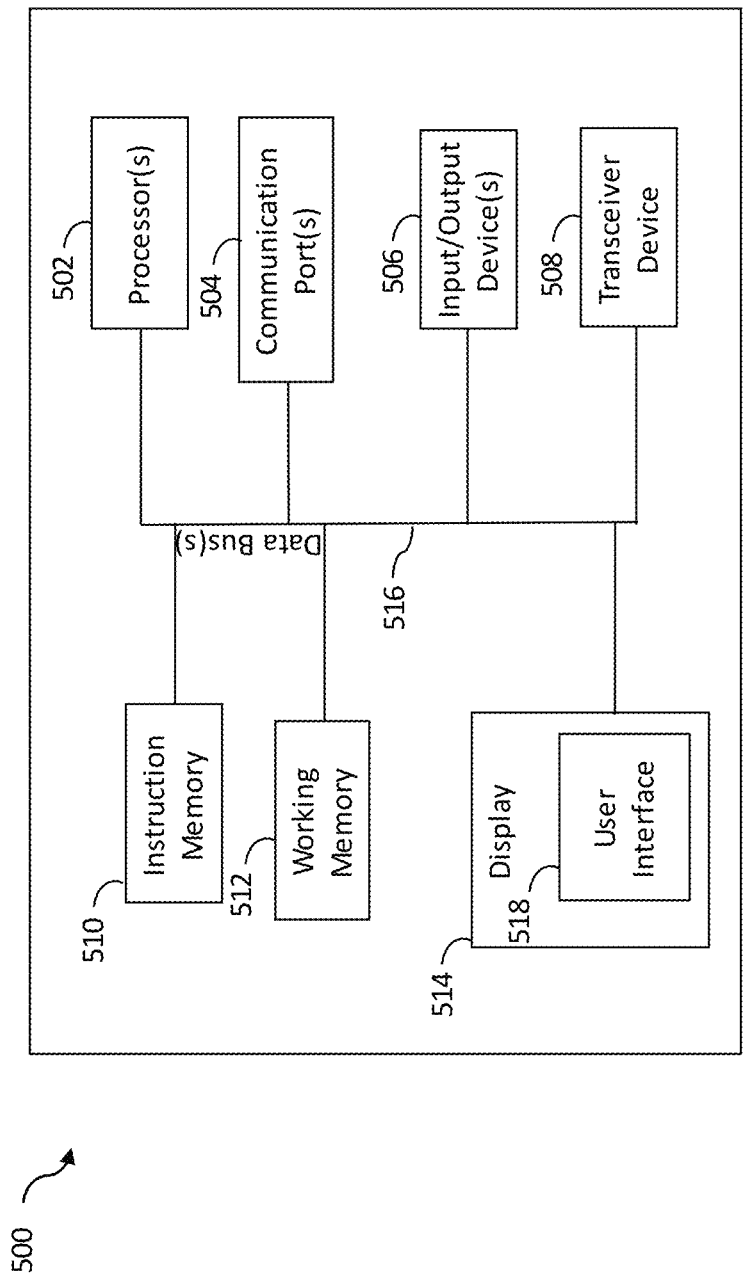
FIG. 5 is an example computing device for communicating with a blown lift tailplane electric propulsion unit in accordance with some embodiments.

FIG. 5 is a block diagram of an example computing device 500 in accordance with some embodiments. The computing device 500 can be employed by a disclosed system or used to execute a disclosed method of the present disclosure. Computing device 500, such as the Power Management Computer (PMC) 602 in FIG. 6, can implement, for example, one or more of the functions described herein. It should be understood, however, that other computing device configurations are possible.

Computing device 500 can include one or more processors 502, one or more communication port(s) 504, one or more input/output devices 506, a transceiver device 508, instruction memory 510, working memory 512, and optionally a display 514, all operatively coupled to one or more data buses 516. Data buses 516 allow for communication among the various devices, processor(s) 502, instruction memory 510, working memory 512, communication port(s) 504, and/or display 514. Data buses 516 can include wired, or wireless, communication channels. Data buses 516 are connected to one or more devices.

Processor(s) 502 can include one or more distinct processors, each having one or more cores. Each of the distinct processors can have the same or different structures. Processor(s) 502 can include one or more central processing units (CPUs), one or more graphics processing units (GPUs), application specific integrated circuits (ASICs), digital signal processors (DSPs), and the like.

Processor(s) 502 can be configured to perform a certain function or operation by executing code, stored on instruction memory 510, embodying the function or operation of the flight path control system 600 illustrated in FIG. 6 and discussed below. For example, processor(s) 502 can be configured to perform one or more of any function, method, or operation disclosed herein.

Communication port(s) 504 can include, for example, a serial port such as a universal asynchronous receiver/transmitter (UART) connection, a Universal Serial Bus (USB) connection, or any other suitable communication port or connection. In some examples, communication port(s) 504 allows for the programming of executable instructions in instruction memory 510. In some examples, communication port(s) 504 allow for the transfer, such as uploading or downloading, of data.

Input/output devices 506 can include any suitable device that allows for data input or output. For example, input/output devices 506 can include one or more of a keyboard, a touchpad, a mouse, a stylus, a touchscreen, a physical button, a speaker, a microphone, or any other suitable input or output device.

Transceiver device 508 can allow for communication with a network, such as a Wi-Fi network, an Ethernet network, a cellular network, or any other suitable communication network. For example, if operating in a cellular network, transceiver device 508 is configured to allow communications with the cellular network. Processor(s) 502 is operable to receive data from, or send data to, a network via transceiver device 508.

Instruction memory 510 can include an instruction memory 510 that can store instructions that can be accessed (e.g., read) and executed by processor(s) 502. For example, the instruction memory 510 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 510 can store instructions that, when executed by one or more processors 502, cause one or more processors 502 to perform one or more of the operations of a flight path control system 600.

In addition to instruction memory 510, the computing device 500 can also include a working memory 512. Processor(s) 502 can store data to, and read data from, the working memory 512. For example, processor(s) 502 can store a working set of instructions to the working memory 512, such as instructions loaded from the instruction memory 510. Processor(s) 502 can also use the working memory 512 to store dynamic data created during the operation of computing device 500. The working memory 512 can be a random access memory (RAM) such as a static random access memory (SRAM) or dynamic random access memory (DRAM), or any other suitable memory.

Display 514 is configured to display user interface 518. User interface 518 can enable user interaction with computing device 500. In some examples, a user can interact with user interface 518 by engaging input/output devices 506. In some examples, display 514 can be a touchscreen, where user interface 518 is displayed on the touchscreen.

Figure 6:
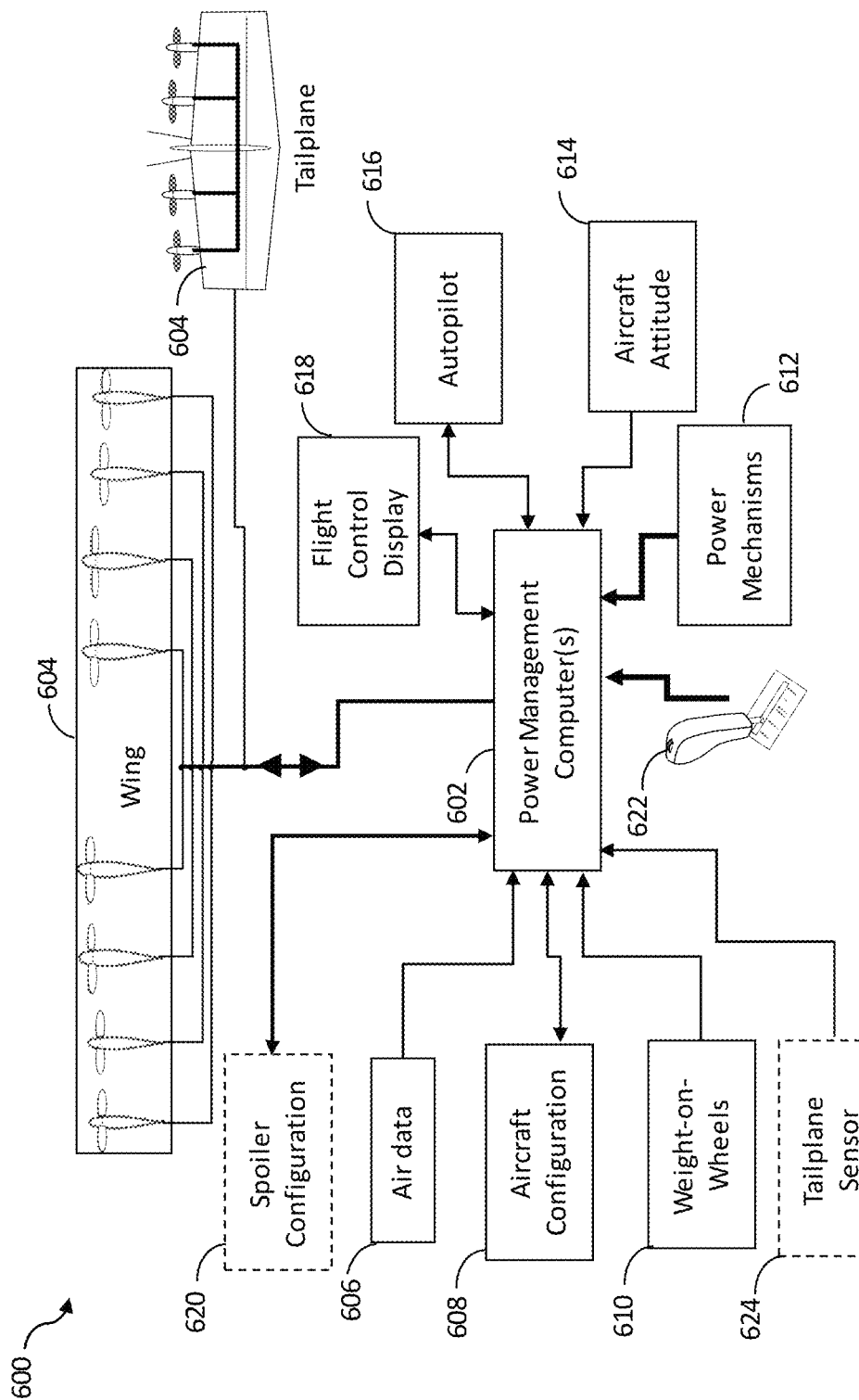
FIG. 6 is an example flight path control system in accordance with some embodiments.

FIG. 6 is a block diagram of an example flight path control system 600 in accordance with some embodiments. The flight path control system 600 includes one or more power management computers PMC(s) 602 configured to control at least two thrust-producing devices 604 along each wing, such as wing EPUs 404, and at least one thrust producing device along the tailplane, such as tailplane EPU(s) 306. In some embodiments the tailplane EPU(s) 306 will be the same as the wing EPUs 404. In other embodiments, the tailplane EPU(s) 306 will be smaller and have less power than the wing EPUs 404. The PMC(s) 602 are configured to control thrust-producing devices based on the selectable position of control operator 622 and a plurality of conditions from a plurality of sensors around the aircraft, such as the inputs into the PMC(s) 602 illustrated in FIG. 6, in order to achieve a target flight path angle. Further disclosure of flight path control system 600 may be found in U.S. patent application Ser. No. 18/085,275 filed on Dec. 20, 2022, the disclosure of which is incorporated by reference herein in its entirety.

The flight path control system 600 is also configured to control the tailplane EPU(s) 306 in response to the plurality of conditions the blown lift aircraft 400 experiences. For example, during a descent/approach or takeoff/climb mode of operation, the flight path control system 600, through the PMC(s) 602, will control the flight path of the blown lift aircraft 400, but may also need to operate the tailplane EPU(s) 306 to increase the tail lift force 316 in response to a high downwash velocity 114 condition experienced during the selected mode of operation (i.e., descent/approach or takeoff/climb). The flight path control system 600, through the PMC(s) 602, may also operate the tailplane EPU(s) 306 in response to a loss of effectiveness of the elevator 314.

Generally, the flight path control system is configured to operate the tailplane EPU(s) 306 in response to high thrust scenarios, which may include deflected flaps and slow airspeed of the blown lift aircraft 400. The two most common scenarios would be during landing and takeoff as discussed above.

The plurality of conditions includes various aircraft and flight parameters used to calculate the desired power level for the thrust-producing devices 604, such as the wing EPU(s) 404 and the tailplane EPU(s) 306 which collectively are illustrated in FIG. 6 as thrust-producing devices 604, to achieve the target flight path angle and provide sufficient tail lift force 316. The plurality of conditions may include an air data module 606, an aircraft configuration module 608, a weight-on-wheels module 610 of the aircraft, two or more power mechanism 612 positions for the two thrust-producing devices 604, an aircraft attitude module 614, the settings from an autopilot (A/P) module 616, and optionally a spoiler module 620 and/or a tailplane sensor module 624. A person of ordinary skill in the art will appreciate that a variety of additional inputs may be provided to the PMC(s) 602 for calculating the desired thrust-producing device 604 power levels and achieving the target flight path angle.

In various embodiments, air data module 606 is configured to be processed by the PMC(s) 602 from a plurality of on-board sensors such as pitot and static probes, angle of attack and sideslip probes, total or static air temperature probes, radar altimeter, normal acceleration and global positioning system (GPS) data based on altitude, position, and atmospheric conditions. In various embodiments, additional data may be obtained from satellite or terrestrial transmitters. A person of ordinary skill in the art will appreciate that various sensors may be used and the above-mentioned list is not exhaustive or limiting. The sensors will provide information about the aircraft's airspeed, altitude (density and physical), and velocity vector. The information can then be processed by the PMC(s) 602 or pre-processors to the PMC(s) 602 to establish the desired aircraft rate and angle of climb or descent. In various embodiments, the air data module 606 is operatively coupled to the aircraft configuration module 608 and, together with an input on the current aircraft weight, calculate the airspeed margin above the stall speed based on the aircraft configuration (i.e., flap deflection, aileron/flaperon deflection, etc.), which can be used to provide optimum targets for the selected mode of operation or phase of flight. The aforementioned optimum targets may include a desired power level for the thrust-producing devices 604, including commanding different power levels for the inboard and outboard thrust-producing devices 604 as necessary depending on various aircraft maneuvers and failure scenarios. In some embodiments, the aforementioned data is communicated to the flight control display 618. For example, the output can be graphically displayed on a user interface 518 via the flight control display 618 to show various flight parameters (speed, altitude, temperature, Mach number, flight path angle, etc.) associated with the on-board sensors as well the computed target flight path angle. In various embodiments the air data module 606 is configured to be an input to the autopilot module 616, or fly-by-wire system, in order to stabilize the aircraft speed or angle of attack during the approach and landing phases of flight.

According to some embodiments, aircraft data such as flap deflection, aileron droop angles, slat extension, trim settings, landing gear extension, aircraft weight, elevator deflection, and center of gravity will be processed by the aircraft configuration module 608 and be received via the PMC(s) 602 to be used in the overall calculation of target thrust-producing device 604 power level to achieve the commanded flight path angle and to operate the tailplane EPU(s) 306 as necessary. In various embodiments, the flap, slat, and/or landing gear extension will determine the lift, drag, and pitching moment information of the aircraft from reference algorithms, lookup tables, and/or machine learned models. The lift information can be used to calculate the margin to the minimum safe flight speed as a function of the thrust-producing device 604 power level. The PMC(s) 602 is configured to use the actual status information of the aircraft configuration (i.e., flap deflection, aileron/flaperon deflection, elevator 314 deflection etc.) to control the thrust-producing device 604 power level according to a calculation method such as lookup tables, referencing an algorithm, and/or utilizing a machine learned model to achieve the target flight path angle or target state.

According to various embodiments, the weight-on-wheels module 610 may be used to indicate, by a weight-on wheels signal, if the aircraft is firmly on the ground (or in the air) using a "squat switch", wheel speed sensors, or other device that can determine the aircraft ground status. In other embodiments, there may be a plurality of switches or sensors for redundancy. The weight-on-wheels module 610 may be verified with plausibility checks using a radar altimeter (RadAlt) or airspeed data. The weight-on-wheels module 610 may be used by the PMC(s) 602 and other input modules to determine the thrust-producing device 604 power levels for takeoff, landing, braking, and taxiing. For example, for a positive weight-on-wheels signal from the weight-on-wheels module 610 the PMC(s) 602 may allow reverse thrust to be applied through the thrust-producing devices 604. Additionally, a positive weight-on-wheels signal may allow taxi power to be applied through the thrust-producing devices 604 instead of cruise power.

Additionally, according to various embodiments, two or more power mechanisms 612 corresponding to the two or more thrust-producing devices, such as switches or circuit breakers, may be used by the pilot to manually shut off power to the thrust-producing devices 604 as needed. The two or more power mechanism 612 positions, such as "On" or "Off", can be used by the PMC(s) 602 to calculate the needed power level of the thrust-producing devices 604. For example, if the position of one of the power mechanisms 612 is in the "Off" position then the PMC(s) 602 may need to raise the power level of at least one thrust-producing device on the same side of the aircraft as the one that corresponds to the thrust-producing device with its corresponding power mechanism 612 in the "Off" position in order to maintain the target flight path angle. Contrary to the wing EPU(s) 404 being configured to operate differentially, the tailplane EPU(s) 306 will be operated symmetrically in accordance with some embodiments.

In some embodiments, the flight path control system 600 also includes an aircraft attitude module 614 in order to provide the PMC(s) 602 with the attitude of the aircraft. The attitude of the aircraft may be provided from a plurality of sensors such as an Attitude Heading Reference System (AHRS), a gyro, Inertial Navigation System, and/or other similar systems. The aircraft attitude module 614 may work in conjunction with various data from the air data module 606 and/or the aircraft configuration module 608, and processed by the PMC(s) 602 in order to ensure the aircraft is maintained within acceptable values of pitch angles. For example, the air data module 606 may provide the airspeed of an aircraft and the aircraft configuration module 608 provides the position of an elevator, the PMC(s) 602 would process the data and could adjust the power level of the thrust-producing devices 604 as needed to maintain an acceptable pitch angle. The PMC(s) 602 may also use this data in conjunction with data from modules of FIG. 6 to power the wing EPU(s) 404 either together or differentially by commanding different power levels individually as needed. In some embodiments, if more than one tailplane EPU 306 is provided they will be powered symmetrically by the PMC(s) 602.

In various embodiments, the autopilot module 616 is configured to provide information to the PMC(s) 602 of activation or status (i.e., if autopilot is on or off) and commanded flight phase or mode of operation of the autopilot module 616. In other embodiments, the autopilot module 616 may utilize one or more algorithms, lookup tables, and/or machine learned model within a fly-by-wire system. Yet in other embodiments, the autopilot module 616 is configured to receive input from the PMC(s) 602 and optimize the commanded flight phase as well as assist in holding airspeed, maintaining or adjusting angle of attack, and maintaining or changing flight altitude. The power level commanded to the thrust-producing devices 604 by the PMC(s) 602 may also be used by the autopilot module 616 based on the autopilot and/or control operator 622 selected position for mode of operation (e.g., takeoff/climb, cruise/taxi, descent/approach, off, reverse). According to various embodiments, the autopilot module 616 may be interchangeable with a fly-by-wire system or module.

In various embodiments, the flight control display 618 is adapted to receive input from a variety of the modules identified in FIG. 6 through the PMC(s) 602. In some embodiments, the flight control display 618 may be the display 514 of the computing device illustrated in FIG. 5. The flight control display 618 is capable of displaying flight and systems information on a user interface 518 of flight control display 618. The user interface 518 is configured to provide information in real-time, such as the plurality of conditions from the input data illustrated in FIG. 6. The user interface 518 may also contain soft-switches replacing the power mechanisms 612 used to shut off power to individual thrust-producing devices 604. The user interface 518 may be configured to provide flight indications such as visual flight information, the calculated target flight path, and power level for the thrust-producing devices 604 just to give a few examples. Although multiple flight indications are listed, it would be obvious to a person of ordinary skill in the art that other flight indications may also be displayed and the aforementioned list is not exhaustive of all flight indications. In some embodiments, the user interface 518 may be configured to show or alert the pilot of various problems or failure scenarios.

The flight path control system 600 optionally includes a spoiler module 620 depending on if the aircraft also includes spoilers. The spoiler module 620 may be configured to extend the spoilers to slow the aircraft and steepen the flight path as needed. The position of the spoilers may be sent by the spoiler module 620 and received by the PMC(s) 602 and/or controlled by the user interface 518 or a switch (not shown) in the cockpit. The spoiler extension and deflection status may be commanded by the PMC(s) 602 or fly-by-wire system (or autopilot module 616) through the spoiler module 620, and the status of the spoilers may be provided on the user interface 518.

The flight path control system 600 may also optionally include a tailplane sensor module 624. The tailplane sensor module 624 may include one or more angle of attack sensors and/or one or more pressure sensors configured to detect flow separation as air passes over the blown lift tailplane 308. In some embodiments, the tailplane EPU(s) 306 may be configured to operate when the tailplane sensor module 624 senses a high downwash velocity 114 or anticpates flow separation 208. In other embodiments, the tailplane EPU(s) 306 may be configured to operate when the elevator 314 has reached a pre-determined angle, such as 20-50 degrees, which could indicate a loss of control authority. The elevator 314 deflection is an input to the aircraft configuration module 608, and would be processed by the PMC(s) 602 to determine when and what power level setting to operate the tailplane EPU(s) 306. For example, the elevator 314 deflection angle would be an input into the aircraft configuration module 608, which ultimately feeds into the algorithms, lookup tables, and models the PMC(s) 602 uses to determine when to operate the tailplane EPU(s) 306 and what power level setting to operate the tailplane EPU(s) 306 at.

In order for the PMC(s) 602 of the flight path control system 600 to command the desired power level of the thrust-producing devices 604 (including wing EPU(s) 404 and tailplane EPU(s) 306) and achieve a target flight path angle of an aircraft, the PMC(s) 602 may use lookup tables, algorithms, and/or machine learned models. The lookup tables, algorithms, and/or machine learned models will be based on the selected position of the control operator 622 for the mode of operation (e.g., Takeoff/Climb, Cruise/Taxi, Descent/Approach, Off, and Reverse) and the input data into the PMC(s) 602 (e.g., air data module 606, aircraft configuration module 608, weight-on-wheels module 610, power mechanism 612 positions, aircraft attitude module 614, autopilot module 616 settings, spoiler module 620 configuration, and/or tailplane sensor module 624). The PMC(s) 602 will compute the required power for each of the thrust-producing devices 604 based on the input data mentioned above and the position of the control operator 622 to achieve a target flight path angle and operate the tailplane EPU(s) 306 as necessary.

The PMC(s) 602 processes the input data mentioned above and illustrated in FIG. 6, and commands the desired thrust-producing device 604 power level based on the flight path angle requested by the selected position of the control operator 622. The PMC(s) 602 will also use the input data mentioned and illustrated in FIG. 6 to determine when to operate the tailplane EPU(s) 306 at a specific power level to provide sufficient tail lift force 316 to overcome any adverse scenario such as high downwash velocity 114 or lack of elevator 314 effectiveness. This power level to the thrust-producing devices 604 may differ between the inboard and outboard wing thrust-producing devices and the thrust-producing device(s) operatively coupled to the tailplane (collectively 604) depending on the mode of operation and the longitudinal maneuver of the aircraft. In some embodiments, the power level needed for the thrust-producing devices 604 will be estimated from the air data module 606, such as from the measured airspeed or angle of attack and vertical speed. In some embodiments, air data module 606 measurements will be used with a prebuilt model of the power required for various flight path angle and airspeed or angle of attack combinations. In some embodiments, the power levels will be commanded based on a measurement of the aircraft position relative to the runway. Of note, not all input module information from FIG. 6 may be needed for every mode of operation.

The algorithms used by the PMC(s) 602 determine the power level to achieve the target flight path angle and/or provide sufficient tail lift force 316 using the appropriate input data, as illustrated in FIG. 6, depending on the selected position of the control operator 622. In various embodiments, the PMC(s) 602 will continuously adjust the power level of the thrust-producing devices 604 based on any airspeed or angle of attack variations, in order to maintain the target flight path angle and/or provide sufficient tail lift force 316. The algorithms can include lookup tables based on aircraft performance and dynamics, closed loop feedback of input data, open loop gain, adaptive and heuristic algorithms. Some algorithms used by the PMC(s) 602 may use best-fit equations to define a preset mapping between power, airspeed, and target flight path angle. As alternatives to algorithms, lookup tables may be used which contain the same input data into the PMC(s) 602 in tabular form and provide the power output of the thrust-producing devices 604. The lookup tables contain the same input functions as algorithms, but the answer is found through interpolation between each of the two-dimensional tables. In other embodiments of the flight path control system 600, a combination of algorithms and lookup tables, or similar open-loop methods of calculation may be used. Additional closed-loop control algorithms may be employed, and can include fixed- or scheduled-gain feedback based on airspeed, vertical speed, and/or sensed position relative to the runway. More sophisticated control approaches including non-linear or machine learned model-based controllers may also be employed in various embodiments. In some embodiments, the models may be a simplified form of the algorithm, where the result only approaches the desired result and the desired result is approached through further closed-loop iterations.

For example, an algorithm for the flight path angle during a descent or approach mode of operation may include input functions (f) that are combined to provide the required output based on design analysis, models, or flight testing. According to some embodiments, the algorithm for flight path angle is Flight Path Angle=f(weight, speed, power, flap configuration, gear configuration). The input functions to the Flight Path Angle algorithm may include a multiplier or separate equation to represent the applicable input function.

Figure 7A:
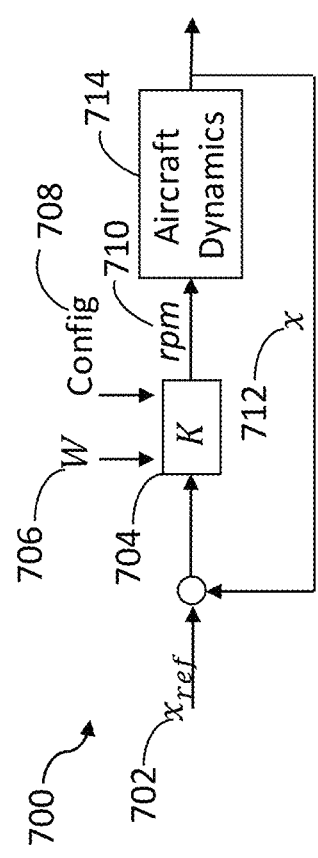
FIG. 7A is a block diagram for calculating the required power of the thrust-producing devices based on an algorithm in accordance with some embodiments.

FIG. 7A is a block diagram for calculating the required power of the thrust-producing devices based on an algorithm in accordance with some embodiments. The flight path control algorithm 700 may be implemented as a tracking controller based on a number of reference states (xref) 702. The reference states 702 may include the normal load factor, GPS location and altitude, vertical speed, or a combination of these or other reference states 702, which could be inputs from air data module 606. The feedback gain (K) 704 can be scheduled with the aircraft weight (W) 706 and aircraft configuration (Config) 708, such as flap, flaperon, spoiler, and/or elevator 314 configuration. The aircraft weight 706 and aircraft configuration 708 may come from the inputs to the aircraft configuration module 608. In other embodiments, the feedback gain (K) 704 may be scheduled with airspeed or some other variable. The thrust-producing devices 604 power or revolutions per minute (RPM) commands 710 are calculated based on the difference between the sensed state 712 based on aircraft dynamics 714 and the reference state 702. The feedback gain (K) 704, which may further be scheduled with variables such as aircraft weight 706 and aircraft configuration 708 from the aircraft configuration module 608. The RPM command 710 can be sent to all of the thrust-producing devices 604 simultaneously or differentially to specific thrust-producing devices.

Figure 7B:
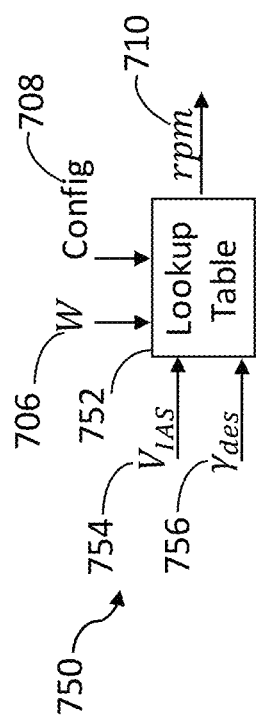
FIG. 7B is a block diagram for calculating the required power of the thrust-producing devices based on a lookup table in accordance with some embodiments.

FIG. 7B is a block diagram for calculating the required power of the thrust-producing devices based on a lookup table in accordance with some embodiments. The flight path control lookup table 750 may include lookup table 752 and a trim map that includes the indicated air speed of the aircraft (VIAS) 754 from air data module 606 and the target flight path angle ($\gamma_{tar}$) 756 based on the selected position of the control operator 622. The lookup table 752 may also take inputs of the aircraft weight (W) 706 and the aircraft configuration (Config) 708, such as the weight and configuration data from the aircraft configuration module 608, to calculate the thrust-producing device's power or RPM command 710. The RPM command 710 can be sent to all of the thrust-producing devices 604 simultaneously or differentially to specific thrust-producing devices 604.

Figure 8:
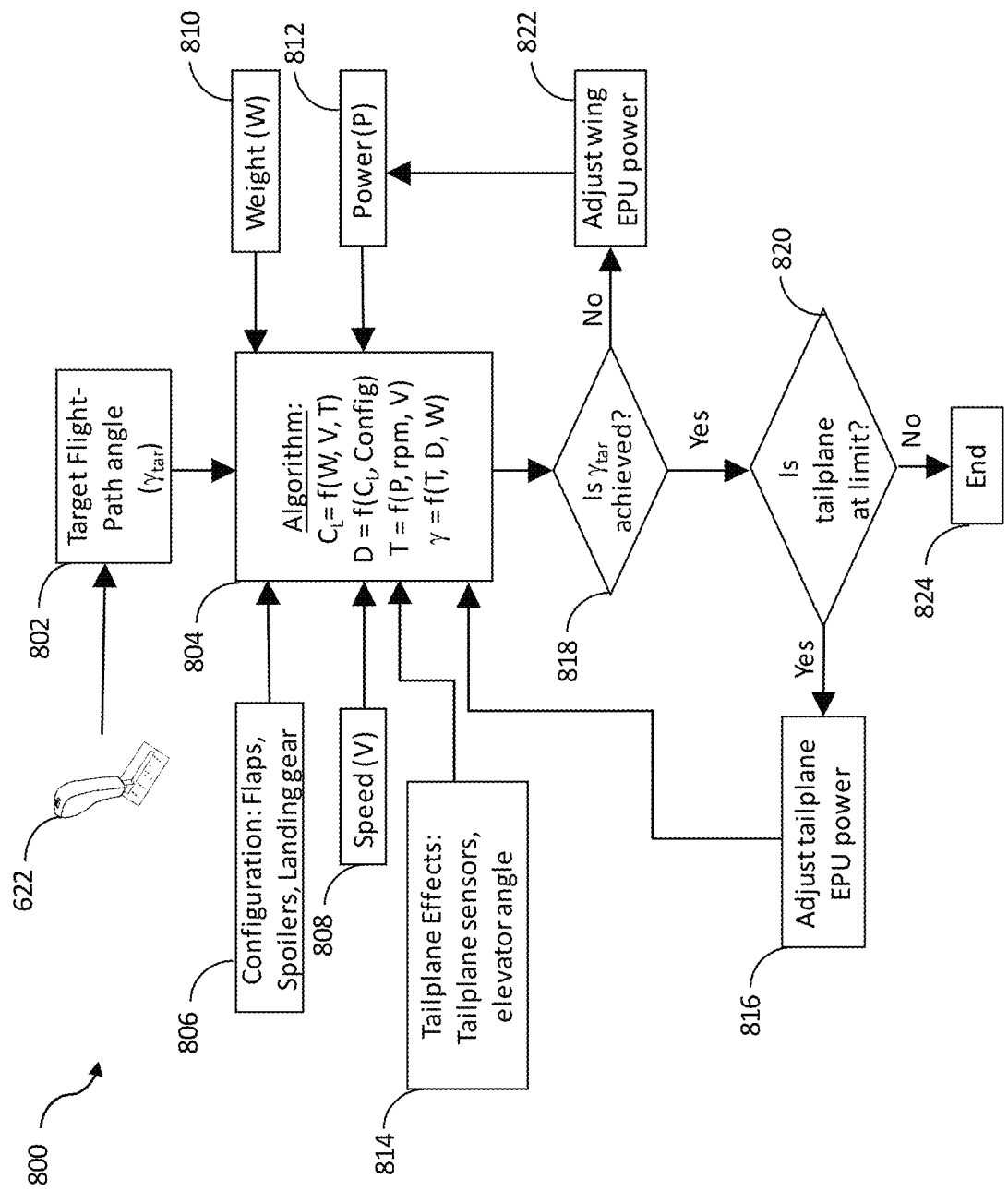
FIG. 8 is a flow chart block diagram for achieving a configurable flight path angle and controlling the blown lift tailplane lift in accordance with some embodiments.

FIG. 8 is a flow chart block diagram for achieving a configurable flight path angle and controlling the blown lift tailplane lift force in accordance with some embodiments. The flow chart block diagram 800 for achieving the target flight path angle and controlling the blown lift tailplane 308 lift force 316 starts with selecting one of the predefined selectable positions from the control operator 622. The selected predefined position of the control operator 622 (e.g., takeoff/climb, cruise/taxi, descent/approach, off, and reverse) will determine the target flight path angle ($\gamma_{tar}$) at step 802. The target flight path angle ($\gamma_{tar}$) may be the desired or optimal flight path angle based on the current mode of operation defined by the selected predefined position of the control operator 622. The PMC(s) 602 may then use various algorithms at step 804 to compute the necessary power or RPM command to ensure the target flight path angle is achieved. The algorithms used in step 804 may include calculating the lift coefficient (CL), drag (D), thrust (T), and/or flight path angle ($\gamma$). The inputs to the algorithms used in step 804 may include the aircraft configuration 806 (e.g., configuration of the flaps, spoilers, ailerons, and/or landing gear) from aircraft configuration module 608. The algorithms used in step 804 may also take into account the speed (V) 808 from the air data module 606, weight (W) 810 from the aircraft configuration module 608, and power (P) 812 (or RPM command) to the wing EPUs 404. The algorithms in step 804 may further include tailplane effects 814, such as AOA sensor or pressure sensor measurements taken from the tailplane sensor module 624 and the elevator 314 deflection angle taken from the aircraft configuration module 608. The algorithms in step 804 may also include the tailplane EPU power 816, which could be included in the overall thrust-producing device (or EPU) 604 power used in the algorithm calculations. The lift coefficient (CL) algorithm may be a function of weight 810, speed 808, and thrust. The drag (D) algorithm may be a function of the lift coefficient (CL) and the aircraft configuration (Config) 806 from the aircraft configuration module 608. The thrust (T) algorithm may be a function of speed (V) 808 from the air data module 606, and power (P) 812 by controlling the wing EPUs 404 rpm. The flight path angle ($\gamma$) algorithm may be a function of thrust, drag, and weight 810 of the aircraft. In some embodiments, the algorithms in step 804 may be replaced with lookup tables as described above.

Continuing to refer to FIG. 8, the PMC(s) 602 will calculate the flight path angle ($\gamma$) from the algorithms in step 804 and compare to the target flight path angle ($\gamma_{tar}$) at step 818. If the target flight path angle is determined to have been achieved at step 818, then the PMC(s) 602 will then determine if the blown lift tailplane 308 is at a limit, such as nearing flow separation or sensing high downwash velocity 114, at step 820. If the target flight path angle is not achieved at step 816 then the power of the wing EPUs 404 are adjusted in step 822 to change the thrust and ultimately the flight path angle of the aircraft. If the PMC(s) 602 determines that the blown lift tailplane 308 is at a limit in step 820, then the power of the tailplane EPU(s) 306 is adjusted at step 816 to provide sufficient blown lift tailplane 308 lift force 316. If the PMC(s) 602 determines that the blown lift tailplane 308 is not at a limit in step 820, then the process (or operation) ends at step 824.

Figure 9:
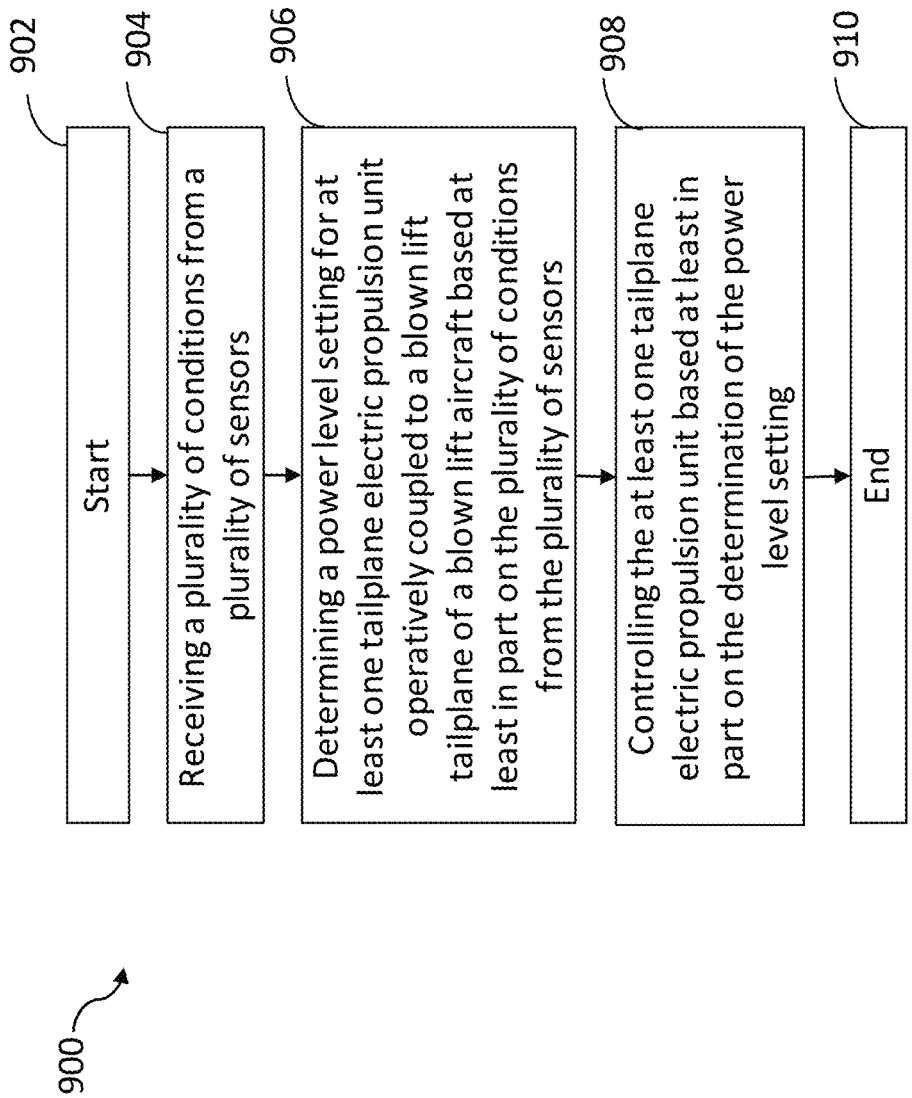
FIG. 9 is a flow chart depicting an example implementation of a set of instructions to control an aircraft in accordance with some embodiments.

FIG. 9 is a flow chart depicting an example implementation of a set of instructions 900 to control an aircraft in accordance with some embodiments. The set of instructions 900 are stored on a non-transitory computer readable medium, such as instruction memory 510 and/or working memory 512. The set of instructions 900 are executed by at least one processor 502, and cause the computing device 500 to perform operations corresponding to the set of instructions 900. The set of instructions 900 starts with step 902 and moves to step 904, where the computing device 500 performs the operation of receiving a plurality of conditions from a plurality of sensors, where the plurality of conditions comprises input data from an air data module 606, an aircraft configuration module 608, a weight-on-wheels module 610 of the aircraft, the positions of power mechanisms 612, an aircraft attitude module 614, an autopilot module 616, and optionally a spoiler module 620 and/or a tailplane sensor 624. At step 906 the computing device 500 performs the operation of determining a power level setting for at least one tailplane electric propulsion unit 306 operatively coupled to a blown lift tailplane 308 of a blown lift aircraft 400 based at least in part on the plurality of conditions from a plurality of sensors. The step 906 performed by the computing device 500 may be performed based at least in part on at least one of an algorithm, a best-fit equation, a lookup table, and a machine learned model, such as those illustrated in FIGS. 7A-8. At step 908 the computing device 500 performs the operation of controlling the at least one tailplane electric propulsion unit 306 based at least in part on the determination of the power level setting. The operation of the computing device 500 then ends at step 910. In some embodiments, the controlling step is performed on two tailplane electric propulsion units 306, which may be done differentially or symmetrically.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or user) module.

The term machine learned model, as used herein, includes data models created using machine learning. Machine learning, according to the present disclosure, may involve putting a model through supervised or unsupervised training. Machine learning can include models that may be trained to learn relationships between various groups of data. Machine learned models may be based on a set of algorithms that are designed to model abstractions in data by using a number of processing layers. The processing layers may be made up of levels of trainable filters, transformations, projections, hashing, pooling, and regularization. The models may be used in large-scale relationships-recognition tasks. The models can be created by using various open-source and proprietary machine learning tools known to those of ordinary skill in the art.

In accordance with some embodiments, a lift augmentation system for a blown lift aircraft may include a blown lift tailplane operatively coupled to the blown lift aircraft. The blown lift tailplane may include a leading edge and a trailing edge, an upper surface and a lower surface, and a first side and a second side. The lift augmentation system may further include one or more tailplane thrust-producing devices on the first side and the second side of the blown lift tailplane operatively coupled to the leading edge of the blown lift tailplane. The one or more tailplane thrust-producing devices on the first side and the second side of the blown lift tailplane may be configured to produce a plurality of slipstreams corresponding to each of the tailplane thrust-producing devices. The plurality of slipstreams corresponding to each of the tailplane thrust-producing devices may blow over the upper surface and the lower surface of the blown lift tailplane.

In accordance with some embodiments, the one or more tailplane thrust-producing devices on the first side and the second side of the blown lift tailplane may be electric propulsion units operatively coupled to a distributed electric propulsion system.

In accordance with some embodiments, the one or more electric propulsion units on the first side and the second side of the blown lift tailplane may include propellers.

In accordance with some embodiments, the blown lift tailplane may further include at least one elevator operatively coupled to the blown lift tailplane.

In accordance with some embodiments, the elevator may be configured to deflect at least between 0-50 degrees from a chord of the blown lift tailplane.

In accordance with some embodiments, two tailplane thrust-producing devices on the first side and the second side of the blown lift tailplane may be operatively coupled to the leading edge of the blown lift tailplane.

In accordance with some embodiments, a vertical stabilizer may be operatively coupled to the blown lift aircraft.

In accordance with some embodiments, a first power level setting to the one or more tailplane thrust-producing devices on the first side and the second side of the blown lift tailplane may be based at least in part on a second power level setting to at least two wing propulsion devices operatively coupled to a pair of wings of the blown lift aircraft.

In accordance with some embodiments, the first power level setting to the one or more tailplane thrust-producing devices on the first side and the second side of the blown lift tailplane may be determined by a computing device based at least in part on at least one of an algorithm, a best-fit equation, a lookup table, and a machine learned model.

In accordance with some embodiments, a lift augmentation system for a blown lift aircraft includes a blown lift aircraft and a blown lift tailplane with a leading edge and a trailing edge, an upper surface and a lower surface, and a first side and a second side operatively coupled to the blown lift aircraft. The lift augmentation system may also include one or more tailplane electric propulsion units of a distributed electric propulsion system operatively coupled to the leading edge on the first side and the second side of the blown lift tailplane. The one or more tailplane electric propulsion units may be configured to produce a plurality of slipstreams corresponding to each of the tailplane electric propulsion units, and wherein the plurality of slipstreams corresponding to each of the tailplane electric propulsion units blow over the upper surface and the lower surface of the blown lift tailplane. The lift augmentation system may also include a computing device communicatively coupled to the one or more tailplane electric propulsion units. The computing device may include at least one processor configured to control a first power level setting of the one or more tailplane electric propulsion units on the first side and the second side of the blown lift tailplane.

In accordance with some embodiments, the one or more tailplane electric propulsion units on the first side and the second side of the blown lift tailplane may include propellers.

In accordance with some embodiments, the blown lift tailplane may further include an elevator operatively coupled to the blown lift tailplane.

In accordance with some embodiments, the elevator may be configured to deflect at least between 0-50 degrees from a chord of the blown lift tailplane.

In accordance with some embodiments, two tailplane electric propulsion devices may be operatively coupled to the leading edge of the first side and the second side of the blown lift tailplane.

In accordance with some embodiments, the first power level setting to the one or more tailplane electric propulsion units on the first side and the second side of the blown lift tailplane may be based at least in part on a second power level setting to at least two wing propulsion devices operatively coupled to a pair of wings of the blown lift aircraft.

In accordance with some embodiment, the controlling the first power level setting of the one or more tailplane electric propulsion units on the first side and the second side of the blown lift tailplane by the computing device may be based at least in part on at least one of an algorithm, a best-fit equation, a lookup table, and a machine learned model.

In accordance with some embodiments, a non-transitory computer readable medium having instructions stored thereon, wherein the instructions, when executed by at least one processor, may cause a computing device to perform operations including receiving a plurality of conditions from a plurality of sensors. The operations may also include determining a power level setting for at least one tailplane electric propulsion unit operatively coupled to a blown lift tailplane of a blown lift aircraft based at least in part on the plurality of conditions from a plurality of sensors. The operations may also include controlling the at least one tailplane electric propulsion unit based at least in part on the determination of the power level setting.

In accordance with some embodiments, the determination may be based at least in part on at least one of an algorithm, a best-fit equation, a lookup table, and a machine learned model.

In accordance with some embodiments, the controlling operation may be performed on two tailplane electric propulsion units based at least in part on the determination of the power level setting.

In accordance with some embodiments, the controlling operation of the two tailplane electric propulsion units may be performed symmetrically on the two tailplane electric propulsion units.

The foregoing is provided for purposes of illustrating, explaining, and describing embodiments of these disclosures. Modifications and adaptations to these embodiments will be apparent to those skilled in the art and may be made without departing from the scope or spirit of these disclosures.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A lift augmentation system comprising:
    one pair of wings operatively coupled to a blown lift aircraft, each wing of the one pair of wings having at least two wing propulsion devices;
    a blown lift tailplane operatively coupled to a vertical stabilizer of the blown lift aircraft, wherein the blown lift tailplane comprises a leading edge and a trailing edge, an upper surface and a lower surface, and a first side and a second side; and
    one or more tailplane thrust-producing devices on the first side and the second side of the blown lift tailplane directly attached to the upper surface of the blown lift tailplane, wherein the one or more tailplane thrust-producing devices on the first side and the second side of the blown lift tailplane are configured to produce a plurality of slipstreams corresponding to each of the tailplane thrust-producing devices, wherein the plurality of slipstreams corresponding to each of the tailplane thrust-producing devices blow over the upper surface and the lower surface of the blown lift tailplane, and wherein a first power level setting to the one or more tailplane thrust-producing devices on the first side and the second side of the blown lift tailplane is based at least in part on a second power level setting to the at least two wing propulsion devices on each wing.

2. The lift augmentation system of claim 1, wherein the one or more tailplane thrust-producing devices on the first side and the second side of the blown lift tailplane are electric propulsion units operatively coupled to a distributed electric propulsion system.

3. The lift augmentation system of claim 2, wherein the one or more electric propulsion units on the first side and the second side of the blown lift tailplane comprise propellers.

4. The lift augmentation system of claim 1, wherein the blown lift tailplane further comprises at least one elevator operatively coupled to the blown lift tailplane.

5. The lift augmentation system of claim 4, wherein the elevator is configured to deflect at least between 0-50 degrees from a chord of the blown lift tailplane.

6. The lift augmentation system of claim 1, wherein two tailplane thrust-producing devices on the first side and the second side of the blown lift tailplane are directly attached to the upper surface of the blown lift tailplane.

7. The lift augmentation system of claim 1, wherein the first power level setting to the one or more tailplane thrust-producing devices on the first side and the second side of the blown lift tailplane is determined by a computing device based at least in part on at least one of an algorithm, a best-fit equation, a lookup table, and a machine learned model.

8. A lift augmentation system comprising:
a blown lift aircraft having one pair of wings, wherein each wing of the one pair of wings has at least two wing propulsion devices;
a blown lift tailplane with a leading edge and a trailing edge, an upper surface and a lower surface, and a first side and a second side operatively coupled to a vertical stabilizer of the blown lift aircraft;
one or more tailplane electric propulsion units of a distributed electric propulsion system directly attached to the upper surface of the first side and the second side of the blown lift tailplane, wherein the one or more tailplane electric propulsion units are configured to produce a plurality of slipstreams corresponding to each of the tailplane electric propulsion units, and wherein the plurality of slipstreams corresponding to each of the tailplane electric propulsion units blow over the upper surface and the lower surface of the blown lift tailplane; and
a computing device communicatively coupled to the one or more tailplane electric propulsion units, wherein the computing device comprises at least one processor configured to control a first power level setting to the one or more tailplane electric propulsion units on the first side and the second side of the blown lift tailplane, and wherein the first power level setting to the one or more tailplane electric propulsion units on the first side and the second side of the blown lift tailplane is based at least in part on a second power level setting to the at least two wing propulsion devices on each wing.

9. The lift augmentation system of claim 8, wherein the one or more tailplane electric propulsion units on the first side and the second side of the blown lift tailplane comprise propellers.

10. The lift augmentation system of claim 8, wherein the blown lift tailplane further comprises an elevator operatively coupled to the blown lift tailplane.

11. The lift augmentation system of claim 10, wherein the elevator is configured to deflect at least between 0-50 degrees from a chord of the blown lift tailplane.

12. The lift augmentation system of claim 8, wherein two tailplane electric propulsion devices are directly attached to the upper surface of the first side and the second side of the blown lift tailplane.

13. The lift augmentation system of claim 8, wherein the controlling the first power level setting of the one or more tailplane electric propulsion units on the first side and the second side of the blown lift tailplane by the computing device is based at least in part on at least one of an algorithm, a best-fit equation, a lookup table, and a machine learned model.

14. A non-transitory computer readable medium having instructions stored thereon, wherein the instructions, when executed by at least one processor, cause a computing device to perform operations comprising:
receiving a plurality of conditions from a plurality of sensors;
determining a first power level setting for at least one tailplane electric propulsion unit directly attached to an upper surface on a first side and a second side of a blown lift tailplane operatively coupled to a vertical stabilizer of a blown lift aircraft based at least in part on the plurality of conditions from the plurality of sensors, wherein the blown lift aircraft has one pair of wings, each wing of the one pair of wings having at least two wing propulsion devices, and wherein the first power level setting of the at least one tailplane electric propulsion unit on the first side and the second side of the blown lift tailplane is based at least in part on a second power level setting to the at least two wing propulsion devices on each wing; and
controlling the at least one tailplane electric propulsion unit on the first side and the second side of the blown lift tailplane based at least in part on the determination of the first power level setting.

15. The non-transitory computer readable medium of claim 14, wherein the determination is based at least in part on at least one of an algorithm, a best-fit equation, a lookup table, and a machine learned model.

16. The non-transitory computer readable medium of claim 14, wherein the controlling operation is performed on two tailplane electric propulsion units based at least in part on the determination of the first power level setting.

17. The non-transitory computer readable medium of claim 16, wherein the controlling operation of the two tailplane electric propulsion units is performed symmetrically on the two tailplane electric propulsion units.

* * * * *